United States Patent
Lee et al.

(10) Patent No.: US 8,913,654 B2
(45) Date of Patent: Dec. 16, 2014

(54) DATA PROCESSING DEVICE AND METHOD FOR ANALYZING STABILITY OF DATA PROCESSING DEVICE

(71) Applicant: Hon Hai Precision Industry Co., Ltd., New Taipei (TW)

(72) Inventors: Cheng-Hsien Lee, New Taipei (TW); Shou-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/741,538

(22) Filed: Jan. 15, 2013

(65) Prior Publication Data

US 2013/0215944 A1    Aug. 22, 2013

(30) Foreign Application Priority Data

Feb. 17, 2012    (TW) .............................. 101105233 A (51) Int. Cl.
  *H03H 7/30*    (2006.01)
  *H04L 1/20*    (2006.01)

(52) U.S. Cl.
  CPC ...................................... *H04L 1/203* (2013.01)
  USPC ........... 375/229; 375/224; 375/230; 375/232; 375/295; 375/316

(58) Field of Classification Search
  CPC ..... H04L 5/0021; H04L 1/04; H04L 27/2637; H04L 1/0056; H04L 25/0202; H04L 27/2601; H04L 27/2697; H04L 1/203; H04L 27/2602; H04L 27/2614; H04L 45/24; H04L 47/10; H04B 1/707; H04B 1/7174
  USPC ......... 375/219, 222, 224, 225, 229, 230, 231, 375/232, 271, 292, 316, 340, 343
  See application file for complete search history.

(56) References Cited

U.S. PATENT DOCUMENTS

| | | | |
|---|---|---|---|
| 6,934,233 B2 * | 8/2005 | Miyashita et al. | 369/53.16 |
| 7,352,821 B2 * | 4/2008 | Kannan et al. | 375/260 |
| 7,363,563 B1 * | 4/2008 | Hissen et al. | 714/733 |
| 7,492,818 B2 * | 2/2009 | Markman et al. | 375/233 |
| 7,555,080 B2 * | 6/2009 | Kim | 375/350 |
| 7,965,761 B2 * | 6/2011 | Shattil | 375/147 |
| 8,472,511 B2 * | 6/2013 | Zerbe et al. | 375/232 |
| 2004/0120407 A1 * | 6/2004 | Searles et al. | 375/259 |
| 2004/0218899 A1 * | 11/2004 | Oyama et al. | 386/46 |
| 2007/0293147 A1 * | 12/2007 | Gagnon et al. | 455/3.06 |
| 2011/0231175 A1 * | 9/2011 | Lee et al. | 703/14 |
| 2011/0265079 A1 * | 10/2011 | Lee et al. | 717/174 |
| 2013/0202065 A1 * | 8/2013 | Chmelar, Erik V. | 375/340 |

* cited by examiner

*Primary Examiner* — Hirdepal Singh
(74) *Attorney, Agent, or Firm* — Novak Druce Connolly Bove + Quigg LLP (57) ABSTRACT

In a data processing device and a method for analyzing stability of the data processing device, one or more sets of equalization parameters and a predetermined bit error ratio (BER) are received. Times and voltages of data points that represent a waveform of an electronic signal generated by the data processing device are read, and an output type of the electronic signal is selected to obtain a time interval of outputs of the electronic signal. Optimal equalization parameters are selected from the one or more sets of equalization parameters to compute a sample interval. Interfering voltages of the electronic signal are computed to select a frequency which is equal to the predetermined BER, and the interfering voltages corresponding to the selected frequency are obtained. An eye pattern is established using the interfering voltages corresponding to the selected frequency, and a determination is made according to the eye pattern.

15 Claims, 7 Drawing Sheets

DATA PROCESSING DEVICE AND METHOD FOR ANALYZING STABILITY OF DATA PROCESSING DEVICE

BACKGROUND

1. Technical Field

Embodiments of the present disclosure generally relate to simulation technology and analysis of electrical signals, and more particularly to a data processing device and a method for analyzing stability of the data processing device.

2. Description of Related Art

Bit error ratio or bit error rate (BER) is the number of bit errors divided by the total number of transferred bits during a time interval. In a communication system, a receiver side BER may be affected by transmission channel noise, interference, distortion, bit synchronization problems, attenuation, wireless multipath fading, for example.

In order to decrease the BER, an equalization filter can be used in a transmission channel between a sender side and a receiver side. The equalization filter is a filter designed to compensate for the unequal frequency response of other signal processing circuits or systems. Using the equalization filter, the signals passing through a transmission channel can be compensated, thus, the BER can be decreased.

However, even using the equalization filter, the BER cannot be eliminated in a data processing device. Bit error may occur over an extended period of time in the data processing device. If the BER of the data processing device is within a particular range, stability of the data processing device is still considered as good, but if the BER of the data processing device is beyond the particular range, stability of the data processing device is considered as poor. Thus, it is important to determine if the data processing device is stable according to the BER.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may be comprised of connected logic units, such as gates and flip-flops, and may be comprised of programmable units, such as programmable gate arrays or processors. The modules described herein may be implemented as either software and/or hardware modules and may be stored in any type of non-transitory computer-readable medium or other computer storage device.

Figure 1:
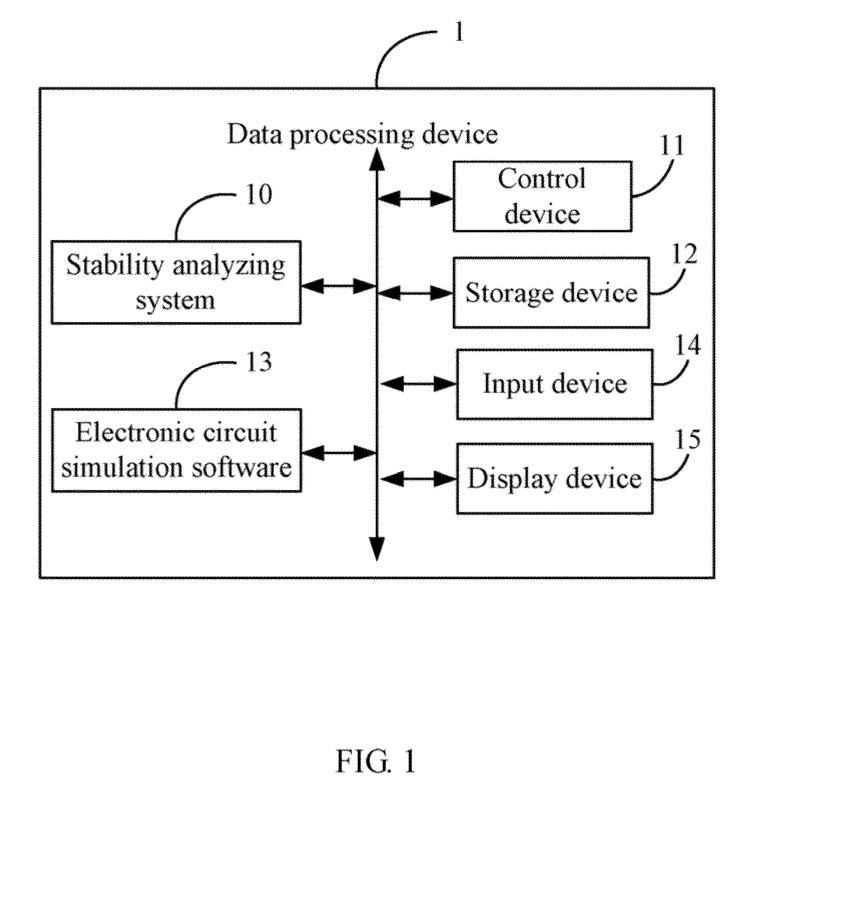
FIG. 1 is a block diagram illustrating one embodiment of a data processing device.

FIG. 1 is a block diagram illustrating one embodiment of a data processing device 1. The data processing device 1 includes components, such as a stability analyzing system 10, a control device 11, and a storage device 12. These components 10-12 communicate over one or more communication buses or signal lines. The data processing device 1 can be any electronic device, including but not limited to a computer, a server, or a personal digital assistant (PDA), a smart phone, for example.

In addition, the data processing device 1 may further include an electronic circuit simulation software 13, which uses mathematical models to replicate the behavior of the data processing device 1 to generate an output file. The output file includes times and voltages of data points that represent a waveform of an electronic/electrical signal (hereafter "signal") generated by the data processing device 1.

The data processing device 1 may have more or fewer components than shown in FIG. 1, or a different configuration of components. The various components shown in FIG. 1 may be implemented in hardware, software or a combination thereof, including one or more signal processing and/or application specific integrated circuits.

The stability analyzing system 10 includes a plurality of function modules (see below descriptions that refer to FIG. 2), to analyze stability of the data processing device 1 according to the output file generated by the electronic circuit simulation software 13.

Figure 2:
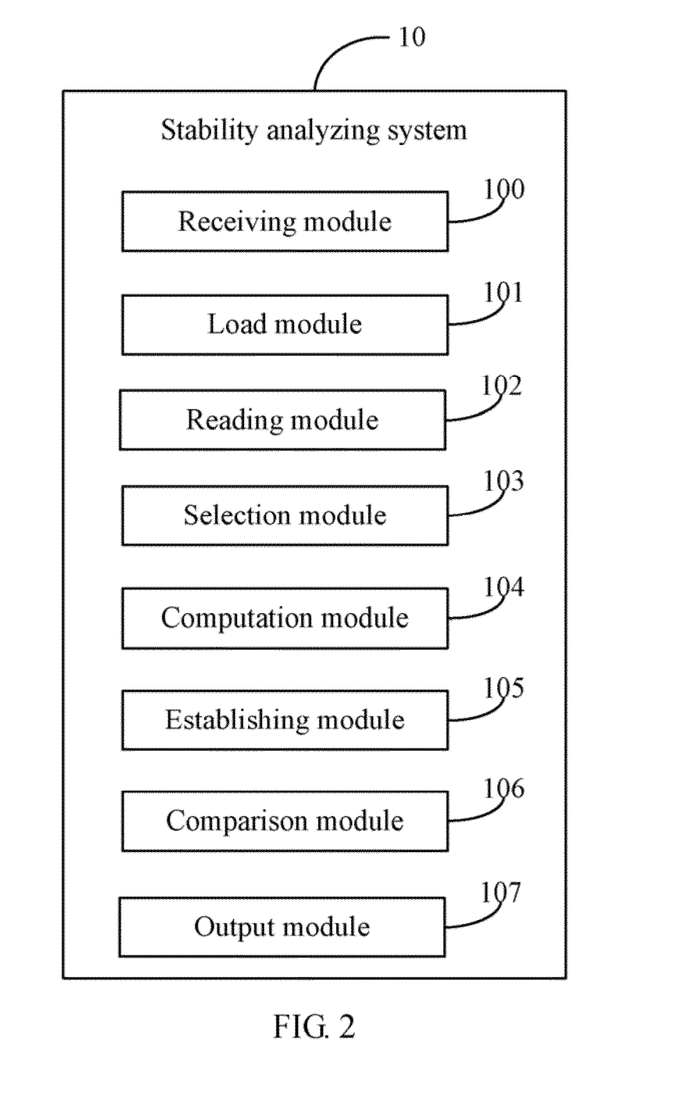
FIG. 2 is a block diagram illustrating function modules of a stability analyzing system included in the data processing device of FIG. 1.

The function modules of the stability analyzing system 10 may include one or more computerized codes in the form of one or more programs that are stored in the storage device 12. The storage device 12 may include some type(s) of non-transitory computer-readable storage mediums, such as a memory, a hard disk drive, a compact disc, a digital video disc, or a tape drive. The one or more computerized codes of the stability analyzing system 10 includes instructions that are executed by the control device 11, to provide functions for the function modules of the system 10. The control device 11 may be a processor, a microprocessor, for example.

FIG. 2 is a block diagram illustrating the function modules of the stability analyzing system 10. The function modules of the system 10 may include a receiving module 100, a load module 101, a reading module 102, a selection module 103, a computation module 104, an establishing module 105, a comparison module 106, and an output module 107. The function modules 100-107 provide at least the functions needed to execute the steps illustrated in FIG. 3A and FIG. 3B.

Figure 3A:
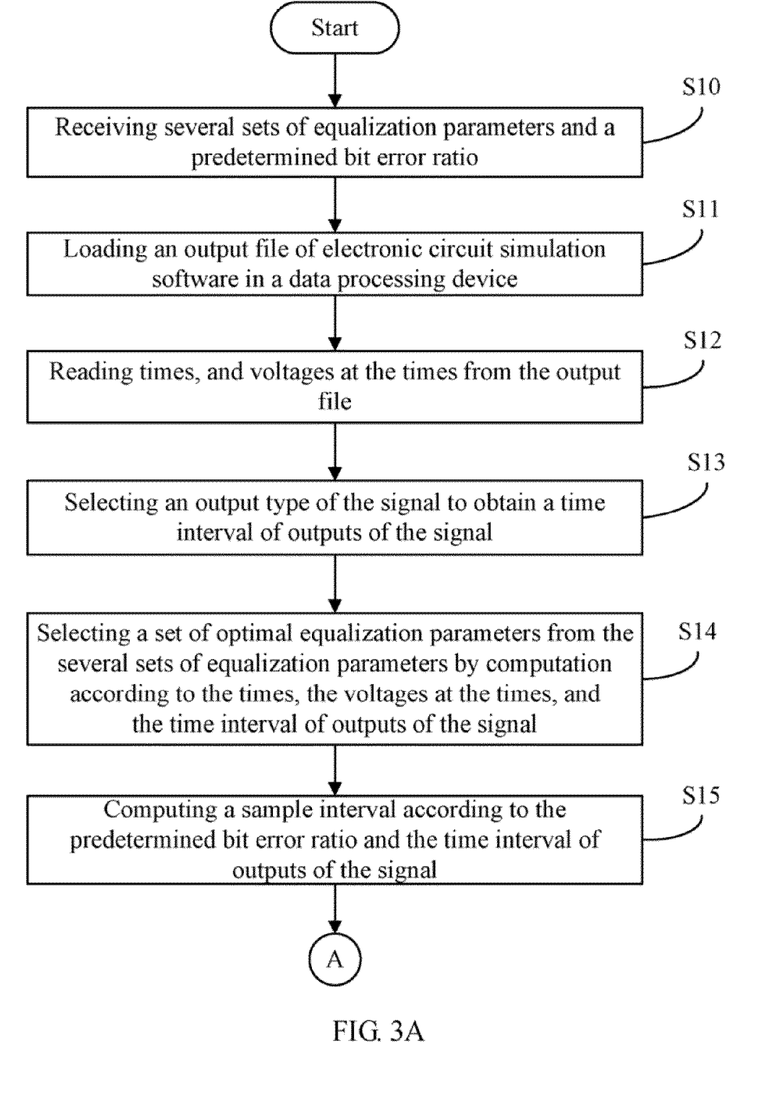
FIG. 3A and FIG. 3B are flowcharts illustrating one embodiment of a method for analyzing stability of a data processing device.
Figure 3B:
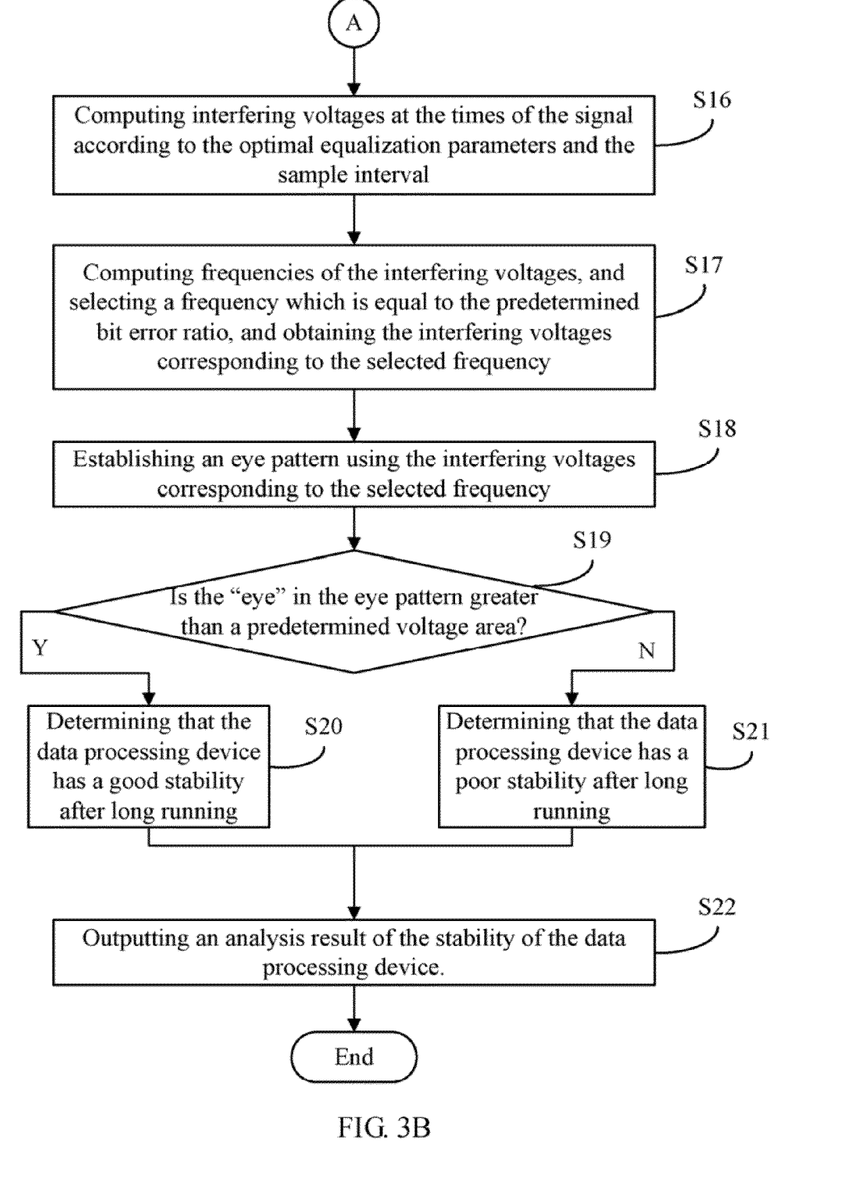

FIG. 3A and FIG. 3B are flowcharts illustrating one embodiment of a method for analyzing stability of the data processing device 1 of FIG. 1. Depending on the embodiment, additional steps may be added, others removed, and the ordering of the steps may be changed.

In step S10, the receiving module 100 receives one or more sets of equalization parameters and a predetermined BER from an input device 14 of the data processing device 1. In one embodiment, a equalization filter can be expressed by a function $y(n)=a*x(n)-b*x(n-1)-c*x(n-2)\ldots$. In the function, $x(n)$ represents a current output of a signal, and $x(n-1)$, $x(n-2)\ldots$ represent previous outputs of the signal. For example, if a time interval of outputs of the signal is 5 second, then, $x(n-1)$ is an output of the signal 5 seconds before, $x(n-2)$ is an output of the signal 10 seconds before, and so on. In the function, a, b, c . . . are the equalization parameters, and y(n) is the output of the signal after compensated.

In step S11, the load module 101 loads an output file of the electronic circuit simulation software 13. As mentioned above, the output file includes times and voltages of data points that represent a waveform of an electronic/electrical signal ("signal" for short) generated by the data processing device 1.

In step S12, the reading module 102 reads the times and the voltages at the respective times from the output file.

In step S13, the selection module 103 selects an output type of the signal to obtain a time interval of outputs of the signal, that is, how often the signal is outputted. The output type may be a peripheral component interconnect (PCI) Express signal type or a universal serial bus (USB) signal type, for example.

In step S14, the computation module 104 selects optimal equalization parameters from the one or more sets of equalization parameters by computation according to the times, the voltages at the times, and the time interval. In one embodiment, the computation module 104 substitutes each set of equalization parameters into the function $y(n)=a*x(n)-b*x(n-1)-c*x(n-2)$ of the equalization filter to select a set of equalization parameters, corresponding to which y(n) makes the signal have minor errors after passing through a transmission channel, as the optimal equalization parameters.

Figure 4:
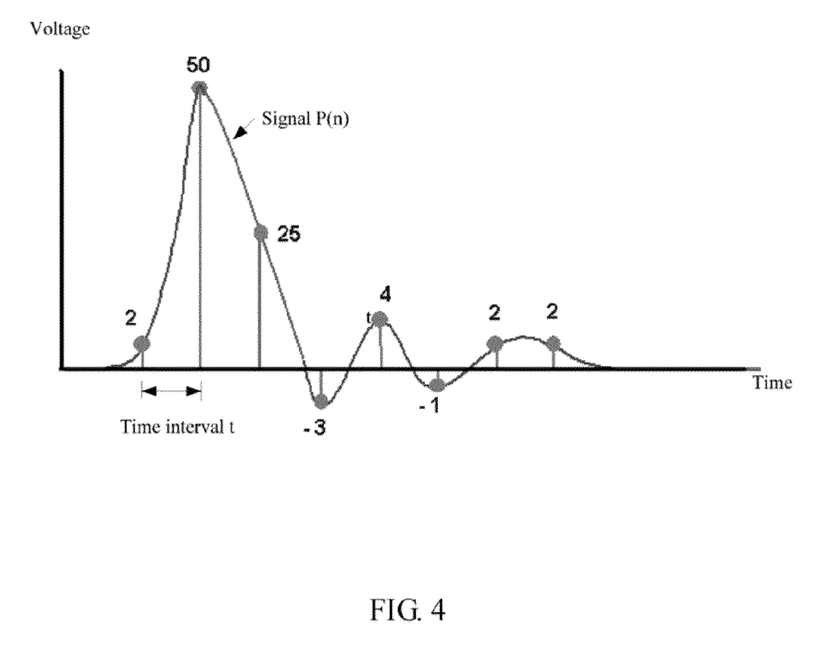
FIG. 4 is a diagram of a waveform of a signal.
Figure 5:
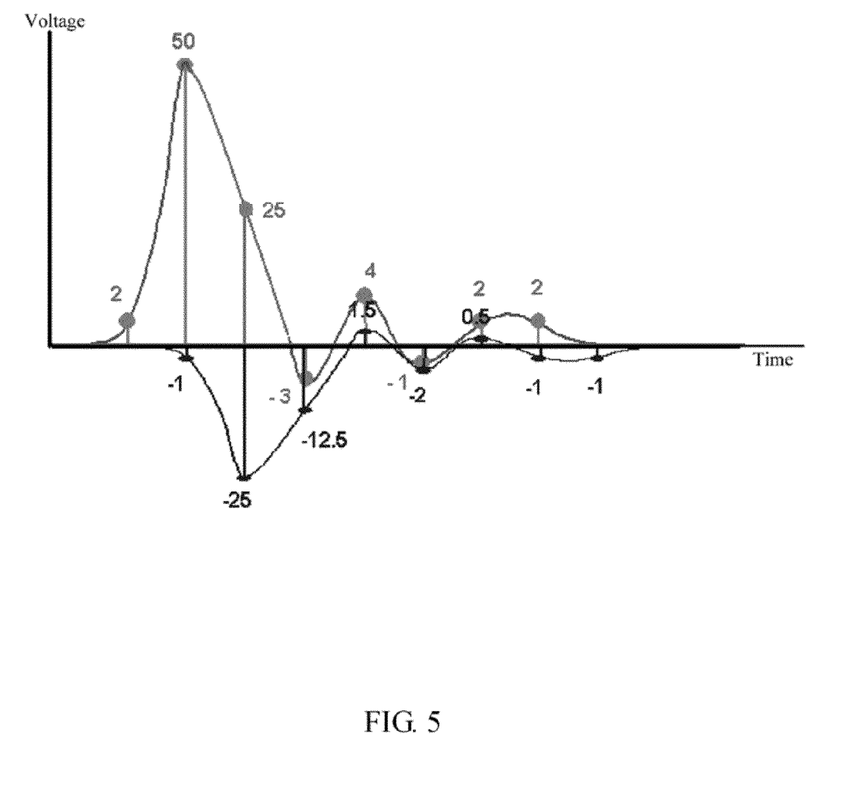
FIG. 5 is a diagram of the signal in FIG. 4 being compensated by an equalization filter.

FIG. 4 is a diagram of a waveform of a signal P(n). According to superposition of the signal P(n), it can be known that, the voltages, such as 25 v, −3 v, 4 v, −1 v, 2 v and 2 v in the current output of the signal P(n) will interfere with the subsequent outputs of the signal P(n). Thus, the voltages 25 v, −3 v, 4 v, −1 v, and 2 v can be called as interferences. Assuming that a set of equalization parameters include a=1, b=0.5, c=0 . . . , then, the function of the equalization filter is $y(n)=x(n)-0.5(n-1)$. Using this equalization filter, referring to FIG. 5, not all the interferences can be eliminated, the maximum interference 25 v can be eliminated, thus, the set of equalization parameters including a=1, b=0.5, c=0 . . . can be considered as the optimal equalization parameters.

In step S15, the computation module 104 further computes a sample interval according to the predetermined BER and the time interval of outputs of the signal. In one embodiment, the computation module 104 uses the functions $T=t*n$ and $BER \approx 2^n$, to compute the sample interval, wherein T is the sample interval and t is the time interval.

In step S16, the computation module 104 further computes interfering voltages of the signal according to the optimal equalization parameters and the sample interval. The interfering voltage is computed by a sum of sample voltages of outputs of the signal at the same time. For example, referring to FIG. 5, the interfering voltages may include 49 v which is generated by 50 v−1 v, 0 v which is generated by 25 v−25 v, −15.5 v which is generated by −3 v−12.5 v, 5.5 v which is generated by 4 v+1.5 v, −3 v which is generated by −1 v−2 v, 2.5 v which is generated by 2 v+0.5 v, 1 v which is generated by 2 v−1 v, and −1 v which is generated by 0 v−1 v.

In step S17, the computation module 104 further computes frequencies of the interfering voltages, and selects a frequency which is equal to the predetermined BER, and obtains the interfering voltages corresponding to the selected frequency. For example, if there are one thousand of interfering voltages computed, and there are one hundred of 49V in the interfering voltages, the frequency of 49 V is 10%.

Figure 6:
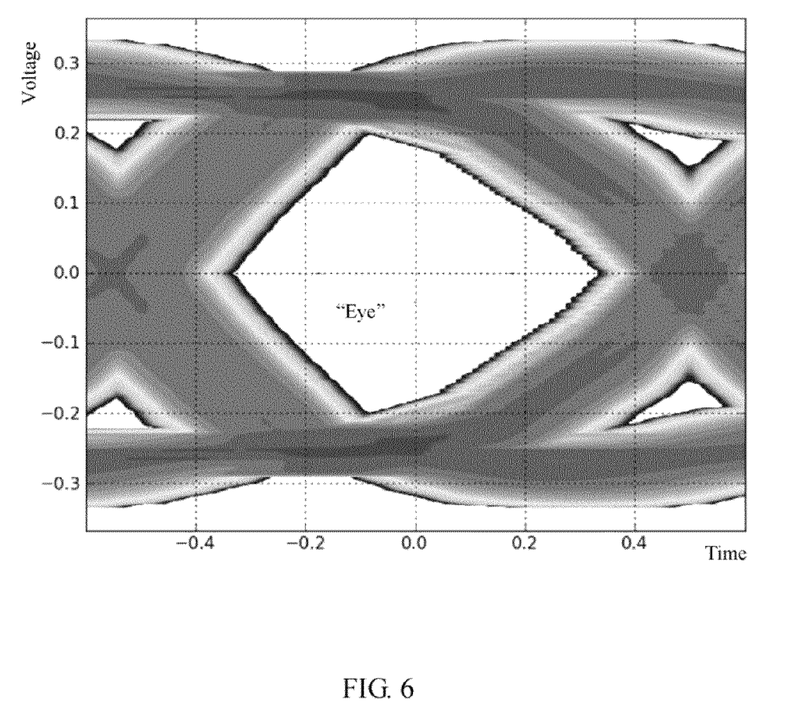
FIG. 6 is a diagram of an eye pattern.

In step S18, the establishing module 105 establishes an eye pattern using the interfering voltages corresponding to the selected frequency, such as illustrated in FIG. 6.

In step S19, the comparison module 106 compares an "eye" in the eye pattern with a predetermined voltage area to determine if the "eye" in the eye pattern is greater than a predetermined voltage area. When the "eye" is equal to or greater than the predetermined voltage area, the process goes to step S20, and the comparison module 106 determines that the data processing device 1 has good stability. When the "eye" is less than the predetermined voltage area, the process goes to step S21, and the comparison module 106 determines that the data processing device 1 has poor stability In block S22, the outputting module 109 outputs an analysis result of the stability of the data processing device 1. In one embodiment, the outputting module 109 outputs the analysis result to display a display device 15 of the data processing device 1, or stores the analysis result to the storage device 12 of the data processing device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for analyzing stability of a data processing device, the method being performed by execution of computer readable program code by a processor of the data processing device, the method comprising:
    receiving one or more sets of equalization parameters and a predetermined bit error ratio (BER) from an input device of the data processing device;
    loading an output file which includes times and voltages of data points that represent a waveform of an electronic signal generated by the data processing device;
    reading the times and the voltages from the output file;
    selecting an output type of the electronic signal to obtain a time interval of outputs of the electronic signal;
    selecting optimal equalization parameters from the one or more sets of equalization parameters by computation according to the times, the voltages at the times, and the time interval;
    computing a sample interval according to the predetermined BER and the time interval of outputs of the electronic signal;
    computing interfering voltages of the electronic signal according to the optimal equalization parameters and the sample interval, and computing frequencies of the interfering voltages;
    selecting a frequency which is equal to the predetermined BER, and obtaining the interfering voltages corresponding to a selected frequency;
    establishing an eye pattern using the interfering voltages corresponding to the selected frequency;
    determining if the data processing device has good stability by comparing the "eye" in the eye pattern with a predetermined voltage area; and
    outputting an analysis result of the stability of the data processing device.

2. The method as described in claim 1, further comprising:
    using mathematical models to replicate the behavior of the data processing device to generate the output file.

3. The method as described in claim 1, wherein the sample interval is computed using the functions $T=t*n$ and $BER \approx 2^n$, wherein T is the sample interval and t is the time interval.

4. The method as described in claim 1, wherein the output type of the electronic signal is a PCI Express signal type or a USB signal type.

5. The method as described in claim 1, wherein the determining step includes:
    determining that the data processing device has good stability when the "eye" in the eye pattern is equal to or greater than the predetermined voltage area, and
    determining that the data processing device has poor stability when the "eye" in the eye pattern is less than the predetermined voltage area.

6. A non-transitory storage medium having stored thereon instructions that, when executed by a processor, cause the processor to perform a method for analyzing stability of a data processing device, the method comprising:
    receiving one or more sets of equalization parameters and a predetermined bit error ratio (BER) from an input device of the data processing device;
    loading an output file which includes times and voltages of data points that represent a waveform of an electronic signal generated by the data processing device;
    reading the times and the voltages from the output file;
    selecting an output type of the electronic signal to obtain a time interval of outputs of the electronic signal;
    selecting optimal equalization parameters from the one or more sets of equalization parameters by computation according to the times, the voltages at the times, and the time interval;
    computing a sample interval according to the predetermined BER and the time interval of outputs of the electronic signal;
    computing interfering voltages of the electronic signal according to the optimal equalization parameters and the sample interval, and computing frequencies of the interfering voltages;
    selecting a frequency which is equal to the predetermined BER, and obtaining the interfering voltages corresponding to a selected frequency;
    establishing an eye pattern using the interfering voltages corresponding to the selected frequency;
    determining if the data processing device has good stability by comparing the "eye" in the eye pattern with a predetermined voltage area; and
    outputting an analysis result of the stability of the data processing device.

7. The non-transitory storage medium as described in claim 6, wherein the method further comprises:
    using mathematical models to replicate the behavior of the data processing device to generate the output file.

8. The non-transitory storage medium as described in claim 6, wherein the sample interval is computed using the functions $T=t*n$ and $BER\approx 2$ superscript n, wherein T is the sample interval and t is the time interval.

9. The non-transitory storage medium as described in claim 6, wherein the output type of the electronic signal is a PCI Express signal type or a USB signal type.

10. The non-transitory storage medium as described in claim 6, wherein the determining step includes:
    determining that the data processing device has good stability when the "eye" in the eye pattern is equal to or greater than the predetermined voltage area, and
    determining that the data processing device has poor stability when the "eye" in the eye pattern is less than the predetermined voltage area.

11. A data processing device, comprising:
    at least one processor;
    storage device;
    one or more programs that are stored in the storage unit and are executed by the at least one processor, the one or more programs comprising:
    a receiving module that receives one or more sets of equalization parameters and a predetermined bit error ratio (BER) from an input device of the data processing device;
    a load module that loads an output file which includes times and voltages of data points that represent a waveform of an electronic signal generated by the data processing device;
    a reading module that reads the times and the voltages from the output file;
    a selection module that selects an output type of the electronic signal to obtain a time interval of outputs of the electronic signal;
    a computation module that selects optimal equalization parameters from the one or more sets of equalization parameters by computation according to the times, the voltages at the times, and the time interval, computes a sample interval according to the predetermined BER and the time interval of outputs of the electronic signal, computes interfering voltages of the electronic signal according to the optimal equalization parameters and the sample interval, computes frequencies of the interfering voltages, selects a frequency which is equal to the predetermined BER, and obtains the interfering voltages corresponding to a selected frequency;
    an establishing module that establishes an eye pattern using the interfering voltages corresponding to the selected frequency;
    a comparison module that determines if the data processing device has good stability by comparing the "eye" in the eye pattern with a predetermined voltage area; and
    an outputting module that outputs an analysis result of the stability of the data processing device.

12. The data processing device as described in claim 11, further comprising:
    an electronic circuit simulation software that uses mathematical models to replicate the behavior of the data processing device to generate the output file.

13. The data processing device as described in claim 11, wherein the computation module computes the sample interval using the functions $T=t*n$ and $BER\approx 2$ superscript n, wherein T is the sample interval and t is the time interval.

14. The data processing device as described in claim 11, wherein the output type of the electronic signal is a PCI Express signal type or a USB signal type.

15. The data processing device as described in claim 11, wherein the comparison module determines that the data processing device has good stability when the "eye" in the eye pattern is equal to or greater than the predetermined voltage area, and determines that the data processing device has poor stability when the "eye" in the eye pattern is less than the predetermined voltage area.

* * * * *